(12) United States Patent
Krasowski et al.

(10) Patent No.: US 10,451,156 B1
(45) Date of Patent: *Oct. 22, 2019

(54) MULTI-SPOKED WHEEL ASSEMBLY

(71) Applicant: U.S.A. as represented by the Administrator of the National Aeronautics and Space Administration, Washington, DC (US)

(72) Inventors: Michael J. Krasowski, Chagrin Falls, OH (US); Lawrence C. Greer, Avon, OH (US)

(73) Assignee: United States of America as Represented by the Administrator of National Aeronautics and Space Adminstration, Washington, DC (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/606,613

(22) Filed: May 26, 2017

Related U.S. Application Data

(63) Continuation of application No. 14/095,442, filed on Dec. 3, 2013, now Pat. No. 9,726,268.

(Continued)

(51) Int. Cl.
*F16H 1/28* (2006.01)
*F16H 3/44* (2006.01)
(Continued)

(52) U.S. Cl.
CPC .............. *F16H 37/041* (2013.01); *A61G 5/06* (2013.01); *A61G 5/061* (2013.01); *A61G 5/065* (2013.01);
(Continued)

(58) Field of Classification Search
CPC ........ F16H 1/2845; F16H 1/2836; F16H 3/46; F16H 3/48
(Continued)

(56) References Cited

U.S. PATENT DOCUMENTS 918,657 A  *  4/1909  Coffee .................... F16H 3/663
                                              475/277
1,970,251 A  *  8/1934  Rossman ................. F16H 1/28
                                              475/335

(Continued)

OTHER PUBLICATIONS

Forsyth, Robert W., Forsyth, John P., title "Design and Development of the TerraStar Marginal-Terrain Amphibian"; Vehicle Group, Lockheed Aircraft Service Co., Div., Lockheed Aircraft Corp.; Society of Automorive Engineers; West Coast Meeting, Aug. 12-15. 1968, San Francisco, California; pp. 1-12; 680535.

(Continued)

*Primary Examiner* — Charles A Fox
*Assistant Examiner* — Ryan P Dodd
(74) *Attorney, Agent, or Firm* — Robert H. Earp, III; William M. Johnson

(57) ABSTRACT

A robust ground traction (drive) assembly for remotely controlled vehicles, which not only operates smoothly on surfaces that are flat, but also upon surfaces that include rugged terrain, snow, mud, and sand, is provided. The assembly includes a sun gear and a braking gear. The sun gear is configured to cause rotational force to be applied to second planetary gears through a coupling of first planetary gears. The braking gear is configured to cause the assembly (or the second planetary gears) to rotate around the braking gear when an obstacle or braking force is applied.

15 Claims, 3 Drawing Sheets

Related U.S. Application Data

(60) Provisional application No. 61/797,742, filed on Dec. 7, 2012.

(51) Int. Cl.
  *F16H 37/04* (2006.01)
  *A61G 5/06* (2006.01)
  *F16H 1/36* (2006.01)
  *F16H 3/58* (2006.01)
  *F16H 3/66* (2006.01)

(52) U.S. Cl.
  CPC .................. *F16H 1/36* (2013.01); *F16H 3/58* (2013.01); *F16H 3/663* (2013.01); *F16H 2001/2881* (2013.01)

(58) Field of Classification Search
  USPC ....... 475/334, 325, 311, 313, 337, 339, 319, 475/288, 346, 903
  See application file for complete search history.

(56) References Cited

U.S. PATENT DOCUMENTS

| | | | | |
|---|---|---|---|---|
| 2,931,449 A | * | 4/1960 | King | A61G 5/061 180/8.2 |
| 3,283,839 A | * | 11/1966 | Brown | A61G 5/061 180/8.2 |
| 3,348,518 A | * | 10/1967 | Forsyth | B60F 3/0007 180/6.2 |
| 3,566,717 A | * | 3/1971 | Berman | B60K 6/365 477/3 |
| 3,580,344 A | * | 5/1971 | Floyd | A61G 5/061 180/8.2 |
| 7,249,640 B2 | | 7/2007 | Horchler et al. | |
| 9,726,268 B1 | * | 8/2017 | Krasowski | F16H 37/041 |

OTHER PUBLICATIONS

Tashjian, R. C., Simmons, J. A., U.S. Marine Corps; title "Marine Corps Marginal Terrain Vehicle XM 759"; Society of Automotive Engineers; International Automotive Engineering Congress, Detroit, Michigan; Jan. 13-17, 1969; pp. 1-12; 690190.

* cited by examiner

MULTI-SPOKED WHEEL ASSEMBLY

CROSS-REFERENCE TO RELATED APPLICATION

This application is a Continuation Application claiming the benefit of priority from U.S. patent application Ser. No. 14/095,442, entitled "Multi-Spoked Wheel Assembly", filed on Dec. 3, 2013, pending, which claims priority to U.S. Provisional Patent Application No. 61/797,742, filed on Dec. 7, 2012, the subject matter of which is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention relates to a spoked wheel assembly, and, more particular, to a spoked wheel assembly having two rotational modes of operation.

BACKGROUND

Track assemblies are complex, and operators generally complain about maintenance issues, as well as the tracks being dislodged or thrown during operation. Further, stair climbing requires a track leading end radius greater than tread height, or requires separate mechanisms. For example, to climb stairs, the surface of the landing preceding the stairs must afford sufficient traction to initiate climbing. Wet, or otherwise slippery, surfaces often thwart climbing.

Wheels are optimal on flat surfaces, and move well over depressions and obstacles, which are less than the radius of the wheel. Wheels have sufficient radius to climb expected and unexpected obstacles and stair heights. However, in surfaces that are loose or covered with snow, the wheels must provide sufficient contact to prevent sinking and must have treads of sufficient texture to maintenance traction. In practice, wheeled robots have not performed well when tested against obstacles such as stairs and rubble.

Whegs assemblies include whegs (wheels) plus leg combinations, which operate nominally as three spokes on a driven axle. On a flat surface, the assembly operates as if legs (i.e., the spokes) are articulating and walking across the surface. Upon reaching an obstacle, the spokes appear to climb up the obstacle as legs would. However, there is a compromise between traction and smoothness of operation. For example, an unwanted up and down, side-to-side jerky displacement can be experienced during locomotion. This jerky operation creates stress on payloads and disrupts video impacting navigation and surveillance.

Thus, a robust ground traction (drive) mechanism for remotely controlled vehicles, which not only operate smoothly on surfaces that are flat, but also upon surfaces that include rugged terrain, snow, mud, and sand, may be beneficial.

SUMMARY

Certain embodiments of the present invention may provide solutions to the problems and needs in the art that have not yet been fully identified, appreciated, or solved by conventional wheel assembly systems. For instance, one or more embodiments of the present invention pertain to a multi-wheeled, spoked drive assembly for robots, and other vehicles, capable of two rotational modes. For example, the assembly can operate smoothly on flat surfaces, i.e., mode 1, and can cooperate on rugged, slick, or muddy surfaces, i.e., mode 2. In one instance, if the surface is loose (e.g., traction is not good), a mechanism can be engaged to force the wheels to rotate about the central assembly. This mechanism may be engaged passively through operator command, or autonomously actuated using feedback from the assembly indicating slippage or approaching a stall state.

In one embodiment, an apparatus is provided. The apparatus includes a sun gear and a braking gear. The sun gear is configured to cause rotational force to be applied to second planetary gears through a coupling of first planetary gears. The braking gear is configured to cause the second planetary gears to rotate around the braking gear when an obstacle or braking force is applied.

In another embodiment, an apparatus is provided. The multi-spoke assembly includes a sun gear and a braking gear. The sun gear is configured to cause rotational force to be applied to second planetary gears via first planetary gears. The braking gear is configured to cause the second planetary gears to rotate around the braking gear when a rotational force of the braking gear is reduced or the braking gear is prevented move spinning.

In yet another embodiment, an apparatus is provided. The apparatus includes a motor driven sun gear and a braking gear. The motor driven sun gear is configured to cause rotational force to be applied to second planetary gears via first planetary gears, causing the apparatus to traverse across a surface. The free spinning braking gear is configured to cause the second planetary gears to rotate around the braking gear when the apparatus an obstacle or braking force is applied.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a multi-spoke driven assembly for robots (or vehicles). The multi-spoked assembly may be configured to include two rotational modes—minor mode and major mode. In the minor mode, the multi-spoked assembly allows for smooth operation on even surfaces. In the major mode, when an obstacle is encountered and traction is good, the multi-spoked assembly is configured to automatically rotate its entire spoked structure and attempt to climb the obstacle. In another embodiment, if the terrain is loose and traction is not good, a mechanism is engaged to force the wheels to rotate about the multi-spoked assembly. This mechanism may be engaged passively, through operator command, or autonomously actuated using feedback from the assembly identifying slippage or stall.

Figure 1:
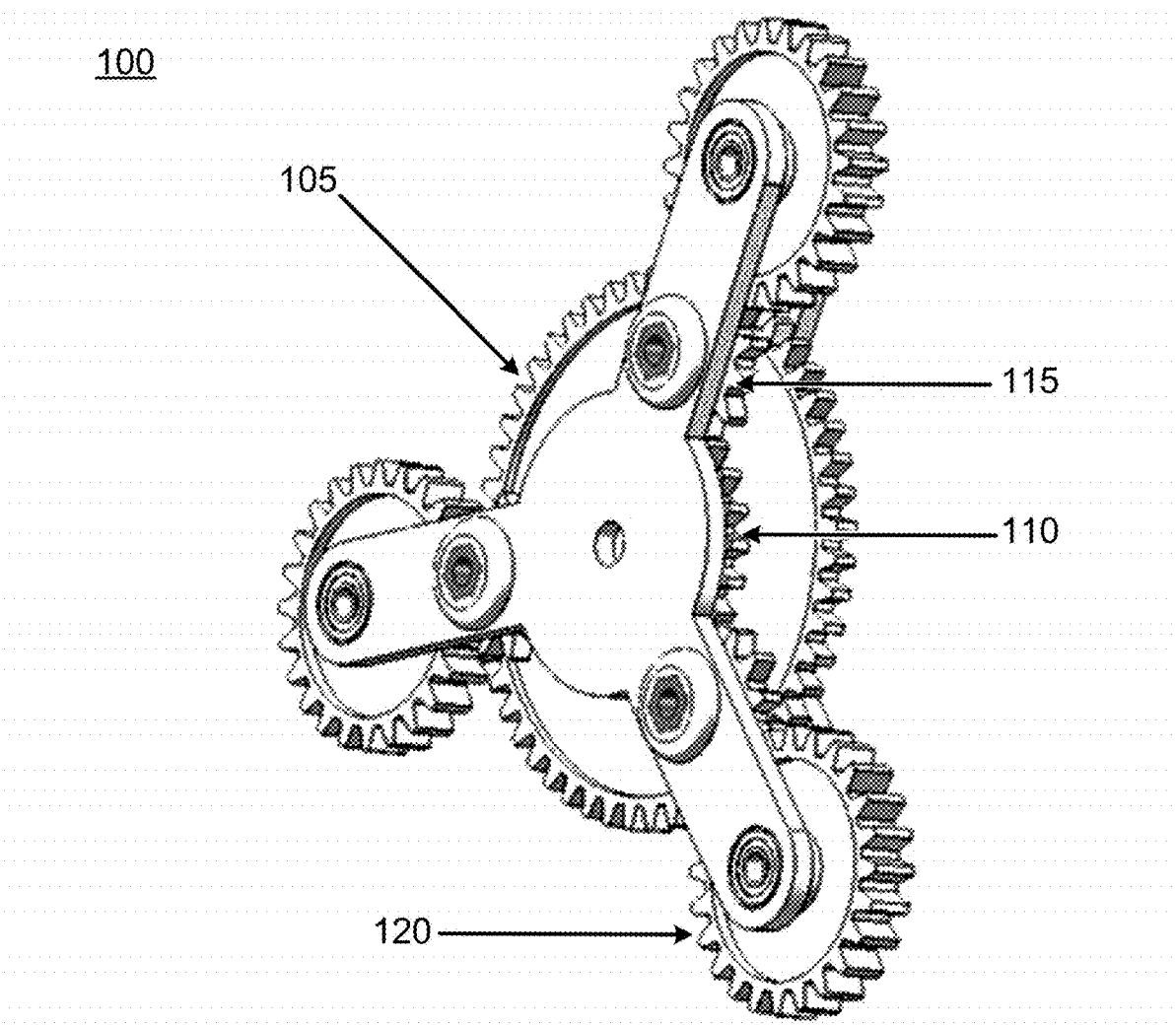
FIG. 1 is a schematic illustrating a three-wheel drive assembly, according to an embodiment of the present invention.

FIG. 1 is a schematic 100 illustrating a three-wheel drive assembly, according to an embodiment of the present invention. As shown in FIG. 3, a front plate 125 and a back plate 130 hold the internal components of the three-wheel assembly, i.e., braking gear 105, sun gear 110, first planetary gears 115, and second planetary gear 120 via locking mechanism 135. See also FIG. 2. In practice, front plate 125 is configured to face the wheels (not shown) and back plate 130 is configured to face the vehicle (also not shown).

The three-wheel drive assembly in this embodiment is a co-axial drive system including a braking gear 105 and a sun gear 110. For instance, sun gear 110 is situated near or at the center most axle and has a first radius R1, and braking gear 105 situated near or at the outer most axle and has a second radius R2. In this embodiment, braking gear 105 is free to spin and, in certain embodiments, may be held fast by a braking mechanism (not shown) causing the three-wheel assembly to rotate about the outer most axle. It should be appreciated that braking mechanism may be located in the vehicle and may be any type of mechanism configured to create a counter force against the coupled forces rotating braking gear 105 such as a caliper and disc, a drum, a band or a scrub brake or a motor 121 using back electromotive force connections, or other methods. The braking mechanism is further configured to prevent braking gear 105 from spinning or reduce the rotational force of braking gear 105.

Sun gear 110 may be motor driven in some embodiments allowing rotational force to be applied to second planetary (or wheel drive) gear 120 through coupling of first planetary gears 115, which have a diameter D. FIG. 3 shows wheels 123 that are attached to second planetary gears 120, allowing the three-wheel drive assembly attached to a vehicle to traverse the surface.

It should be appreciated that the width of second planetary gears 120 is sufficiently wide to allow braking gear 105 and first planetary gears 110 to contact second planetary gears 120. In this embodiment, during operation, sun gear 110 and second planetary gears 120 rotate in a first direction, while braking gear 105 and first planetary gears 115 rotate in a second direction (or reverse direction). This allows the three-wheel drive assembly to traverse across a surface with at least one or two wheels contacting the surface at all times. When an obstacle is encountered and there is sufficient forward momentum, or when the braking mechanism applies brakes to braking gear 105 and the rotational force of braking gear 105 is stopped or reduced, second planetary gears 120 are configured to "walk" around braking gear 105. It should be noted that when braking gear 105 is held fast (or prevented from spinning), braking gear 105 does not rotate causing the second planetary gears 120 to rotate around braking gear 105.

It should be appreciated that the three-wheel drive assembly may operate in two modes—a minor mode and a major mode. In the minor mode, the three-wheel drive assembly allows for smooth operation on even surfaces. For example, two of the three wheels on the ground provide traction allowing the vehicle to traverse the surface. In the major mode, when the three-wheel drive assembly encounters an obstacle and sufficient friction is realized with the ground, the three-wheel drive assembly is configured to rotate allowing the three-wheel drive assembly to "walk" over the obstacle.

In certain embodiments of the major mode, braking gear 105 may be held fast in relation to the vehicle (by a braking mechanism) preventing braking gear 105 from spinning. Second planetary gears 120, which mesh with braking gear 105, are configured to drive around the circumference of braking gear 105, allowing the three-wheel assembly to rotate, or "walk", around an obstacle. It should be appreciated that complete braking need not be applied to braking gear 105, instead fractional (or modulated) braking on low friction surfaces can be sufficient to cause the three-wheel assembly to enter into the major mode allowing the three-wheel assembly to rotate.

Figure 2:
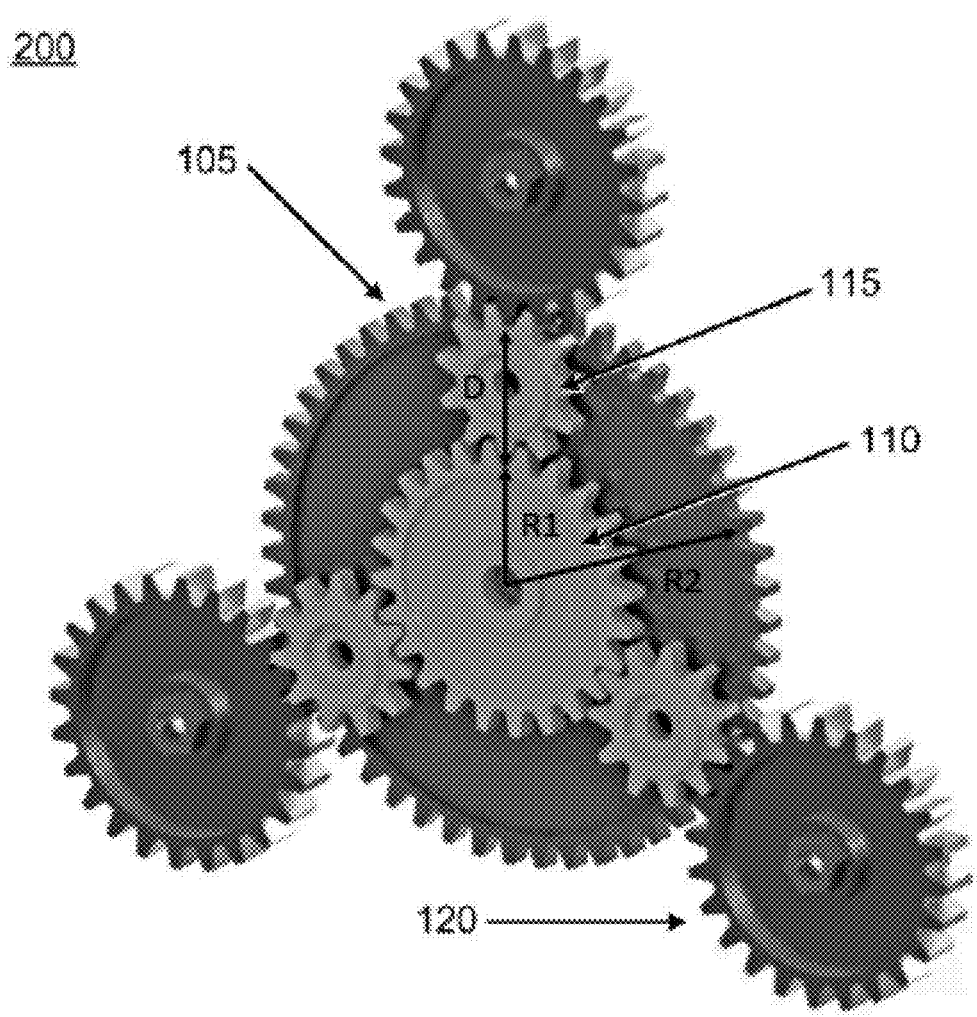
FIG. 2 is a schematic illustrating internal components of a three-wheel drive assembly, according to an embodiment of the present invention.
Figure 3:
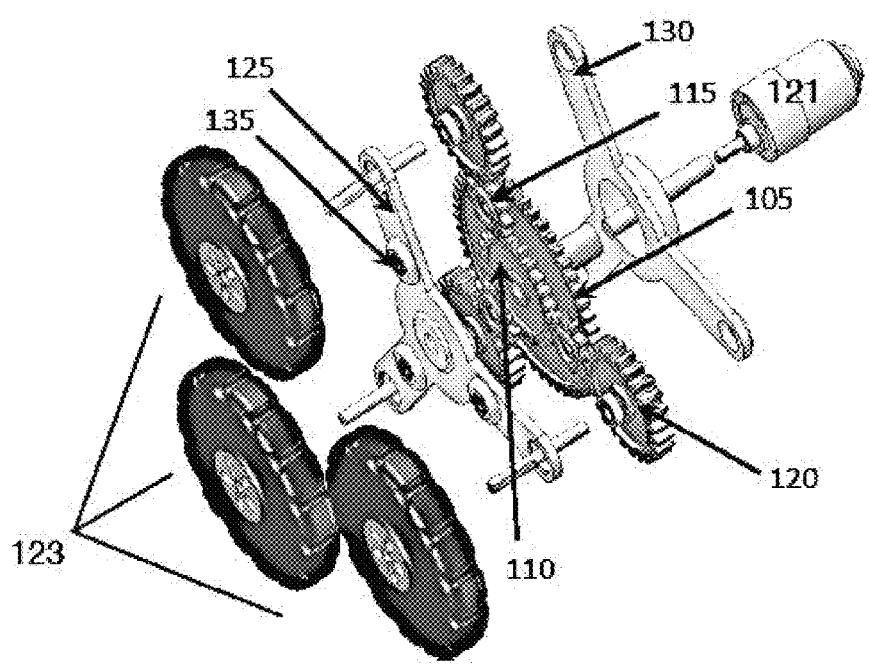
FIG. 3 is a schematic illustrating a three-wheel drive assembly, according to an embodiment of the present invention.

It should be appreciated that the assembly shown in FIGS. 1-3 are not limited to a three spoke or three-wheel drive assembly. The drive assembly may be designed to include any number of spokes, e.g., two, three, four, etc. The drive assembly is configured such that second planetary gears 120 are configured to rotate about the braking gear 105 when braking gear 105 is prevented from spinning or the rotational force of braking gear 105 is reduced. It should further be appreciated that the diameter of the gears may vary according to the desired optimization of the assembly.

It should also be appreciated that embodiments of the present inventions may be applied to robots for use by first responders (and others). For example, embodiments of the present invention may provide a multi-spoked wheel assembly that moves in a direction of optimizing a robot (or vehicle) for smooth operation on a flat surface, the ability to climb over obstacles including climbing of stairs, "walk" or move through loose surfaces, such as mud, snow, sand, etc. It should be appreciated that the spoked wheel drive assembly is robust, such that the assembly cannot come apart during normal operation of the vehicle, and may include a housing to contain and protect the gears and axles. The multi-spoked drive assembly may be further configured to switch between different modes of operation, i.e., passively, through user command, or autonomously.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In order to determine the metes and bounds of the invention, therefore, reference should be made to the appended claims.

The invention claimed is:

1. An apparatus, comprising:
   a sun gear rotatable about a sun gear axis;
   a braking gear rotatable about the sun gear axis independently of the sun gear;
   a first plurality of planetary gears in mesh engagement with the sun gear;
   a second plurality of planetary gears, wherein each one of the second plurality of planetary gears is in mesh engagement with a corresponding one of the first plurality of planetary gears as well as the braking gear;
   a plurality of axles, wherein each one of the plurality of axles is fixedly attached to one of the second plurality of planetary gears; and
   a plurality of wheels, wherein each wheel in the plurality of wheels is connected to an associated axle of the plurality of axles;
   wherein:
      in a first mode of operation of the apparatus, rotational energy is transferred from the sun gear to the second plurality of planetary gears via the first plurality of planetary gears such that each of the second plurality of planetary gears rotates about an independent planetary gear axis thereof to transfer rotational energy and cause independent rotation of the plurality of axles and the plurality of wheels, and
      in a second mode of operation of the apparatus, a difference in rotational energy between the braking gear and the sun gear causes the second plurality of planetary gears to rotate in unison around the sun gear axis.

2. The apparatus of claim 1, wherein the apparatus is switchable from the first mode of operation to the second mode of operation via application of a braking mechanism to the braking gear, wherein application of the braking mechanism to the braking gear causes the difference in rotational energy.

3. The apparatus of claim 2, wherein application of the braking mechanism occurs autonomously.

4. The apparatus of claim 2, wherein application of the braking mechanism occurs in response to receipt of a user command.

5. The apparatus of claim 1, wherein the first and second pluralities of planetary gears are uniformly distributed about the sun gear axis.

6. An apparatus, comprising:
   a sun gear rotatable about a central axis;
   a braking gear rotatable about the central axis independently of the sun gear, wherein both the sun gear and the braking gear are substantially circular-shaped, wherein the sun gear has a first radius and the braking gear has a second radius, the second radius larger than the first radius;
   a first plurality of planetary gears in mesh engagement with the sun gear at an outer circumference of the sun gear, wherein each of the first plurality of planetary gears is substantially circular-shaped and has a diameter, wherein the diameter plus the first radius is approximately equal to the second radius such that portions of the first plurality of planetary gears are substantially flush with a circumferential edge of the braking gear to form an engagement surface;
   a second plurality of gears in mesh engagement with both the first plurality of planetary gears and the braking gears at the engagement surface;
   a plurality of axles, wherein each one of the plurality of axles is fixedly attached to one of the second plurality of planetary gears; and
   a plurality of wheels, wherein each wheel in the plurality of wheels is attached to a separate axle of the plurality of axles,
   wherein:
      in a first mode of operation of the apparatus, rotational energy is transferred from the sun gear to the second plurality of planetary gears via the first plurality of planetary gears such that each of the second plurality of planetary gear rotates to transfer rotational energy to and cause independent rotation of the pluralities of axles and wheels, and
      in a second mode of operation of the apparatus, a difference in rotational energy between the braking gear and the sun gear causes the second plurality of planetary gears to rotate in unison around the central axis.

7. The apparatus of claim 6, wherein the first and second pluralities of planetary gears are uniformly distributed about the central axis.

8. The apparatus of claim 7, wherein the first and second pluralities of planetary gears both include three gears.

9. The apparatus of claim 6, further comprising:
   a front plate and a back plate, wherein the front plate and back plate are configured to hold the sun gear, the first planetary gears, the second planetary gears, and the braking gear to form the apparatus.

10. The apparatus of claim 6, wherein the second plurality of planetary gears does not rotate in unison about the central axis in the first mode of operation.

11. A multi-spoked assembly, comprising:
    a motor driven sun gear rotatable about a central axis;
    a braking gear rotatable about the central axis independently of the sun gear;
    a first plurality of planetary gears in mesh engagement with the sun gear;
    a second plurality of planetary gears, wherein each one of the second plurality of planetary gears is in mesh engagement with a corresponding one of the first plurality of planetary gears as well as the braking gear; and
    a plurality of wheels, each wheel connected to one of the plurality of second planetary gears,
    wherein:
       in a first mode of operation of the multi-spoked assembly, rotational energy is transferred from the sun gear to the second plurality of planetary gears via the first plurality of planetary gears such that each of the second plurality of planetary gears and a corresponding one of the wheels rotate about an independent axis of the planetary gear, and
       in a second mode of operation of the multi-spoked assembly, a difference in rotational energy between the braking gear and the sun gear causes the second plurality of planetary gears and wheels to rotate in unison around the central axis.

12. The multi-spoked assembly of claim 11, wherein, in the first mode of operation, the multi-spoked assembly traverses a surface via frictional contact between a subset of the wheels and the surface due to rotation of the subset.

13. The multi-spoked assembly of claim 11, wherein the apparatus is switchable from the first mode of operation to the second mode of operation via application of a braking mechanism to the braking gear, wherein application of the braking mechanism to the braking gear causes the difference in rotational energy.

14. The multi-spoked assembly of claim 13, wherein application of the braking mechanism occurs autonomously.

15. The multi-spoked assembly of claim 13, wherein application of the braking mechanism occurs in response to receipt of a user command.

* * * * *